(12) United States Patent
Isbilen et al.

(10) Patent No.: US 10,259,667 B2
(45) Date of Patent: Apr. 16, 2019

(54) TRANSPORTATION SYSTEM

(71) Applicant: AYGAZ ANONIM SIRKETI, Istanbul (TR)

(72) Inventors: Emrah Isbilen, Istanbul (TR); Can Tikiroglu, Istanbul (TR); Emrah Birsen, Kocaeli (TR); Ali Kemal Eker, Korfez/Kocaeli (TR); Tolga Karasu, Tuzla/Istanbul (TR); Semih Karagoz, Besiktas (TR); Rahmi Ugur, Kosekoy (TR); Caner Cekic, Esenyurt (TR)

(73) Assignee: AYGAZ ANONIM SIRKETI, Istanbul (TR)

( * ) Notice: Subject to any disclaimer, the term of this patent is extended or adjusted under 35 U.S.C. 154(b) by 0 days.

(21) Appl. No.: 15/537,935

(22) PCT Filed: Sep. 2, 2015

(86) PCT No.: PCT/TR2015/000308
§ 371 (c)(1),
(2) Date: Jun. 20, 2017

(87) PCT Pub. No.: WO2016/108776
PCT Pub. Date: Jul. 7, 2016

(65) Prior Publication Data
US 2017/0349388 A1 Dec. 7, 2017

(30) Foreign Application Priority Data
Dec. 30, 2014 (TR) .................................. 2014 16154

(51) Int. Cl.
*B65G 57/30* (2006.01)
*B65B 35/52* (2006.01)
*B65G 61/00* (2006.01)

(52) U.S. Cl.
CPC ............ *B65G 57/302* (2013.01); *B65B 35/52* (2013.01); *B65G 61/00* (2013.01); *B65G 2201/0241* (2013.01)

(58) Field of Classification Search
CPC .......... B65G 57/302; B65G 2201/0241; B65B 35/52
(Continued)

(56) References Cited

U.S. PATENT DOCUMENTS 3,057,486 A 10/1962 Moulthrop et al.
4,199,287 A * 4/1980 Salts .................... B65G 57/302
414/792.6
(Continued)

FOREIGN PATENT DOCUMENTS

FR 2661163 A1 * 10/1991 ............. B65B 69/00
TR 200809040 A2 6/2010
TR 200809040 B * 6/2010 ............. B65B 69/00

OTHER PUBLICATIONS

International Search Report and Written Opinion for corresponding PCT application No. PCT/TR2015/000308, filed Sep. 2, 2015.

*Primary Examiner* — Gregory W Adams
(74) *Attorney, Agent, or Firm* — Notaro, Michalos & Zaccaria P.C.

(57) ABSTRACT

A transportation system for stacking/carrying of containers including a panel, which has a stacking unit positioned on the panel and including a first body in which the containers are stacked; a transport element for transferring the container onto the panel by means of a first displacing member and including a base on which the container is placed; a second displacing member for transferring the container positioned on the base into the first body; a gripping arm that holds the transferred container; a third displacing member that moves the gripping arm; and a locking arm which has a flexible member that holds the container; a transport unit (Continued)

positioned on the panel; a displacing mechanism; a transport arm which is associated with the movable plate and which lifts the containers; and a support shaft having a fixing arm.

23 Claims, 4 Drawing Sheets

(58) Field of Classification Search
USPC .......................... 414/788.9, 789.9, 95.3, 799
See application file for complete search history.

(56) References Cited

U.S. PATENT DOCUMENTS

| | | | |
|---|---|---|---|
| 4,247,238 A * | 1/1981 | Imhauser | B65G 59/026 198/468.6 |
| 4,316,693 A | 2/1982 | Baxter et al. | |
| 4,498,381 A * | 2/1985 | Convey, Jr. | B65H 31/26 100/100 |
| 4,787,799 A | 11/1988 | Platteschorre | |
| 4,992,016 A * | 2/1991 | Ferloni | B65H 67/065 414/27 |
| 7,717,665 B2 * | 5/2010 | Jenkins | B65G 57/302 187/360 |
| 8,066,469 B2 * | 11/2011 | Trejo | B65G 57/302 414/794.7 |
| 2005/0116552 A1 | 6/2005 | Safonov | |

\* cited by examiner

TRANSPORTATION SYSTEM

FIELD OF THE INVENTION

The present invention relates to a transportation system for stacking containers one above another and transporting the stacked containers from one position into another.

BACKGROUND ART

When containers that contain solid, liquid or gaseous materials such as LPG and CNG are, for example, being loaded on distributing vehicles for transportation, these must be carried from one position into another in a multiple manner. In order to perform a fast carriage process, containers may be stacked one above another, which facilitates carriage of the containers; and since containers are placed on the distributing vehicles in stacked condition, less space is occupied. The prior art document TR200809040A2 discloses a system that grips the gas cylinders conveyed along a conveyor line and moves them along two axes to stack them one above another. Such containers, after they are stacked, cannot be transported into the desired position with manpower, mainly due to the fact that the containers are heavy. In order to transport said containers, various transport systems are used in the prior art. An example of the said transport systems is disclosed in US2005116552A1. In the transport system disclosed in US2005116552A1, pallets on which containers are placed are carried from one position into another by means of the arms of transport system. However, at present, there is a need for an integrated transportation system which not only performs stacking of containers but also carries the stacked containers, in order to facilitate transportation of the containers from one position into another.

BRIEF DESCRIPTION OF THE INVENTION

With the present invention, there is provided a transportation system which performs stacking and carrying of containers that contain solid, liquid and/or gaseous material from one position into another in a multiple manner, and which includes at least one panel. Said transportation system (S) comprises at least one stacking unit positioned on the panel that allows containers to be stacked one above another and that includes at least a first body in which the containers are stacked and which is positioned on the said panel; at least one transport unit which allows transferring a container desired to be stacked from the position where it is located onto the said panel, by means of at least a first displacing member, and which comprises at least one base on which said container is placed; at least a second displacing member for transferring the container positioned on the said base into the said first body; at least one gripping arm that holds a container transferred into the first body; at least a third displacing member that moves the said gripping arm in a direction perpendicular to the panel; and at least one locking arm which is positioned in the said first body and at a desired height from the panel and which has at least one flexible member that holds the container that has reached to the said height, at the height where it is located, as well as at least one transport unit which is positioned on the panel and which includes at least one displacing arm which allows the containers stacked one above another in the stacking unit to be transported into a desired position, and which is positioned on at least a second body contained therein and which is capable of rotating; at least one displacement mechanism including at least one fixed plate positioned the said displacing arm and having at least one guiding arm for moving the containers received in stacked condition, and at least one movable plate capable of moving on the said fixed plate with respect to the panel; and at least one transport arm which is associated with the said movable plate and which lifts the stacked containers; and at least one support shaft having at least one fixing arm positioned so as to hold at least one container in order to prevent said containers to be separated from each other during the transportation process and which is in contact with the said stacked containers.

With the inventive transportation system, there is provided a system which performs stacking of containers in which a material is placed and transportation of the stacked containers into a desired position, without hazard to the persons and/or goods therearound. Furthermore, said transportation system reduces the need for manpower in order to transport containers.

OBJECT OF THE INVENTION

An object of the present invention is to provide a transportation system for stacking containers one above another and for carrying the stacked containers.

Another object of the present invention is to provide a transportation system that reduces the need for manpower to stack the containers and that reduces the need for manpower to carry the stacked containers.

Another object of the present invention is to provide a safe transportation system that prevents the containers from tilting, during the stacking and carrying processes, and from damaging persons and/or goods therearound.

Yet another object of the present invention is to provide a transportation system which is easy-to-use.

DESCRIPTION OF THE DRAWINGS

The exemplary embodiments of a transportation system according to the present invention are illustrated in the enclosed drawings, in which.

Figure 1:
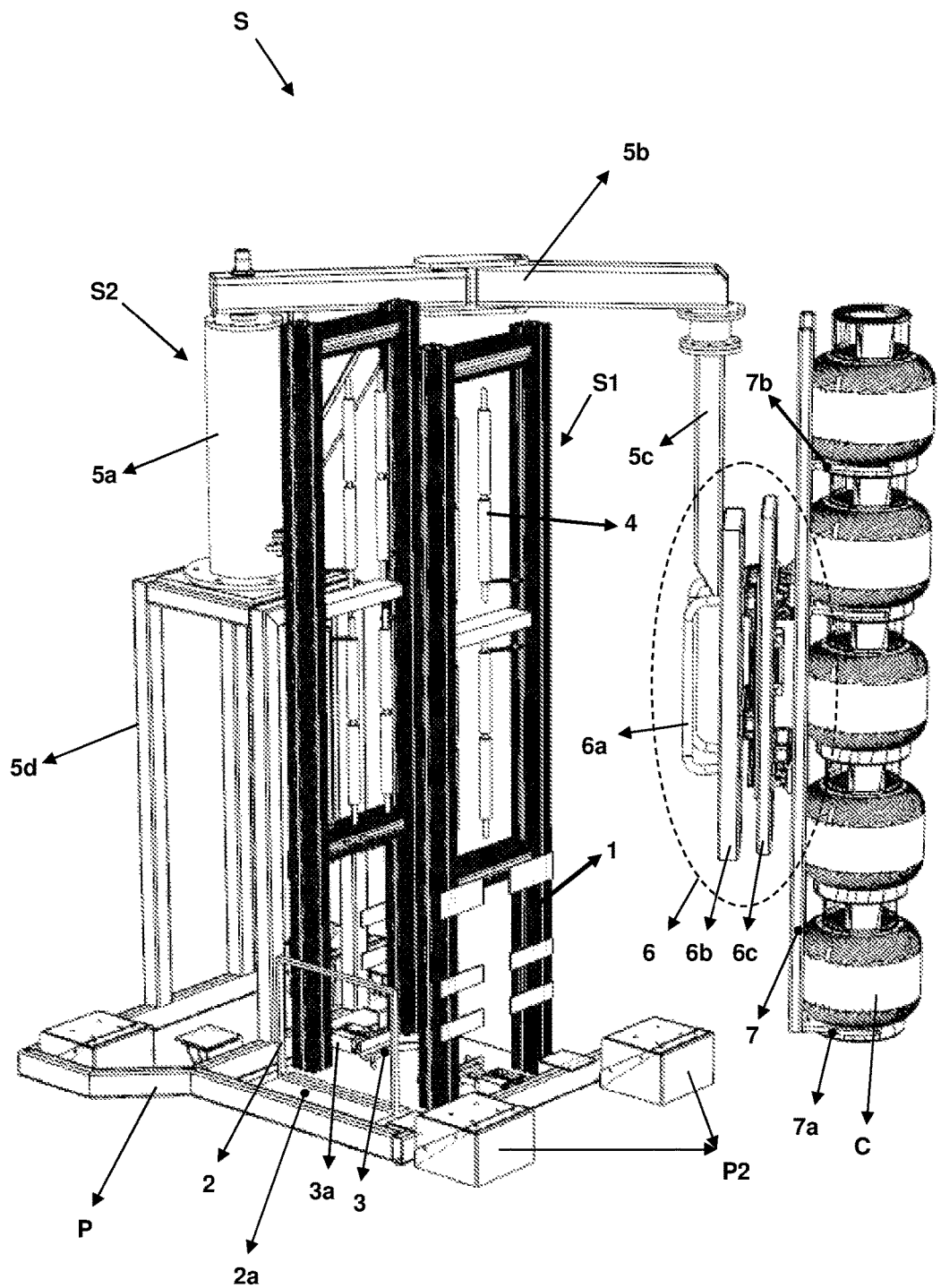
FIG. 1 is a perspective view of a transportation system according to the present invention.

All the parts illustrated in the figures are individually assigned a reference numeral and the corresponding terms of these numbers are listed as follows:

| | |
|---|---|
| Transportation system | (S) |
| Stacking unit | (S1) |
| Transport unit | (S2) |
| Panel | (P) |
| Movable part | (P1) |
| Protective sheath | (P2) |
| Container | (C) |
| First body | (1) |
| Transport element | (2) |
| Base | (2a) |
| Gripping arm | (3) |
| Fourth displacing member | (3a) |
| Shaft | (4) |
| Connecting member | (4a) |
| First portion | (5a) |
| Second portion | (5b) |

| | |
|---|---|
| Third portion | (5c) |
| Second body | (5d) |
| Movable mechanism | (6) |
| Guiding arm | (6a) |
| Fixed plate | (6b) |
| Movable plate | (6c) |
| Support shaft | (7) |
| Transport arm | (7a) |
| Fixing arm | (7b) |

DESCRIPTION OF THE INVENTION

At present, such containers exemplified with home-use gas cylinders may be required to be transported from one position into another in a multiple manner. For such purposes, geometrically matching containers may be stacked one above another so that multiple containers are transported simultaneously and also when loaded on a distributing vehicle so as to be transported or on a storage area, for example, the containers occupy less place. However, if said transportation process is performed by manpower, it will pose danger, due to the fact that the containers are mainly heavy. Therefore, with the present invention, there is provided a transportation system for stacking said containers one above another and carrying the stacked containers.

Figure 2:
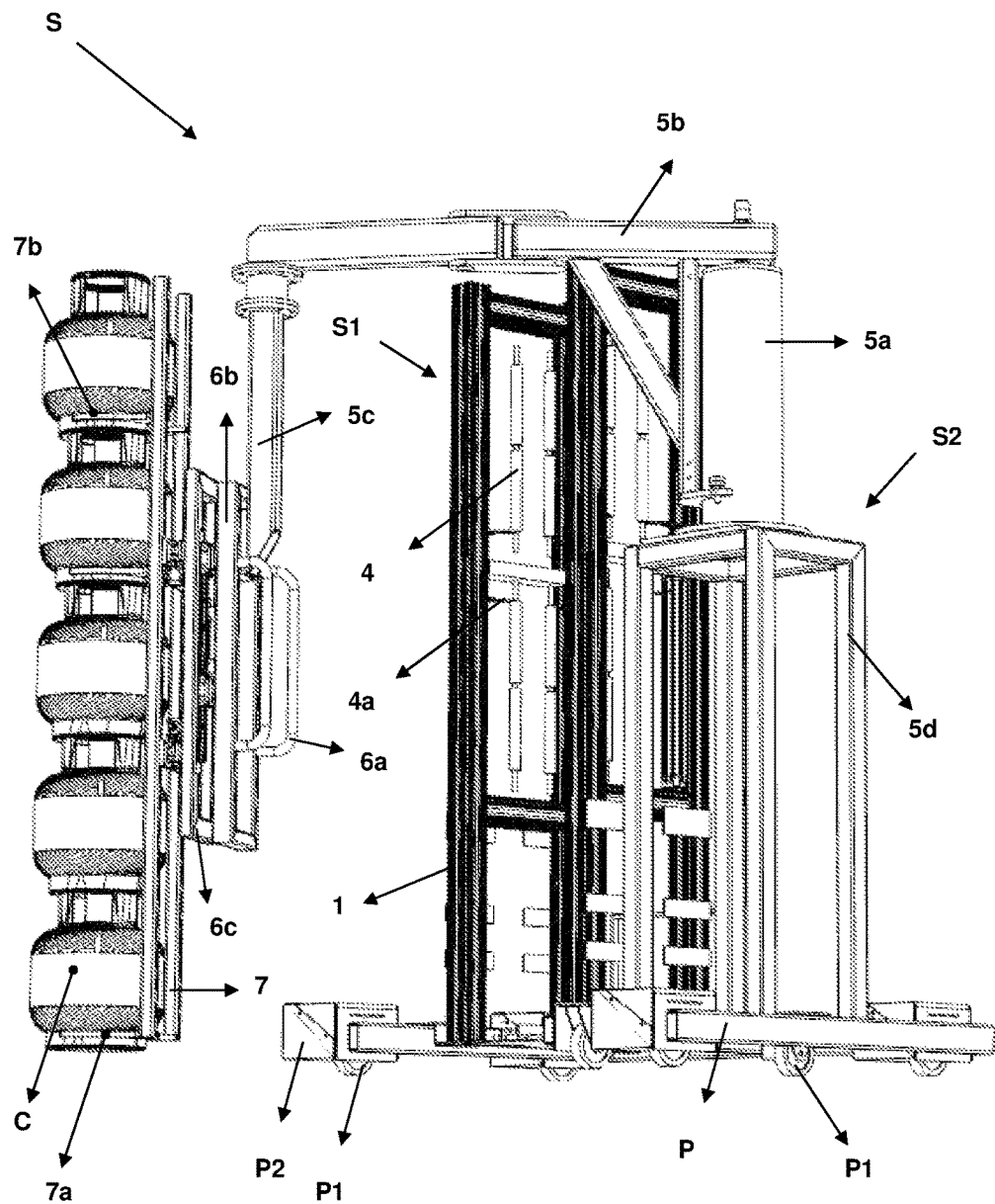
FIG. 2 is another perspective view of the transportation system according to the present invention.
Figure 3:
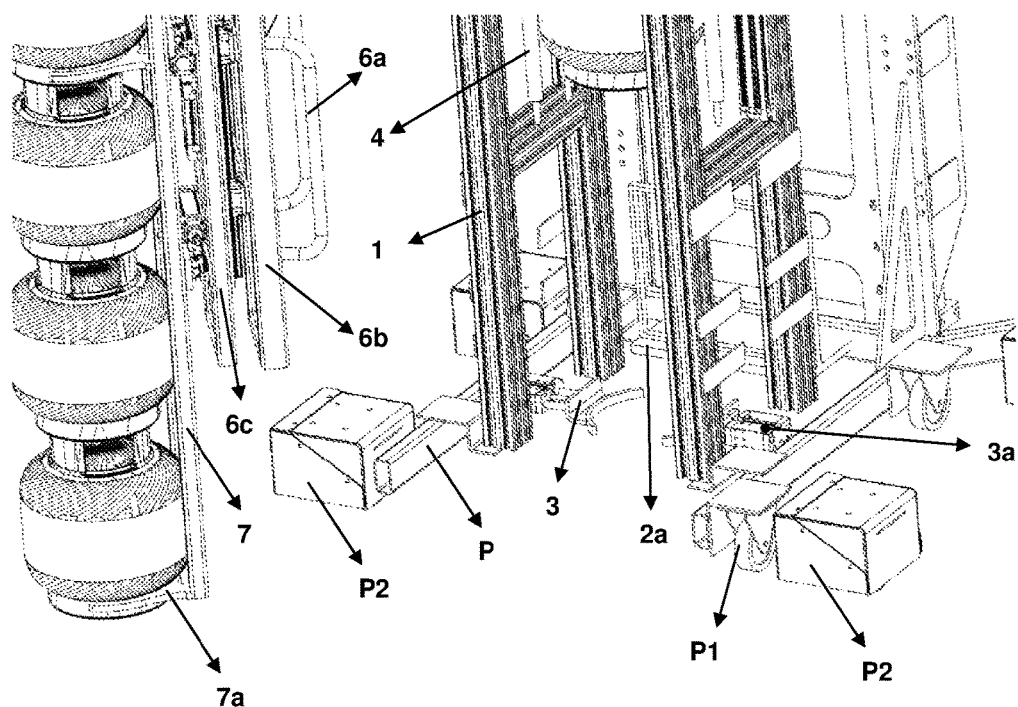
FIG. 3 is a detailed view of the transportation system according to the present invention.
Figure 4:
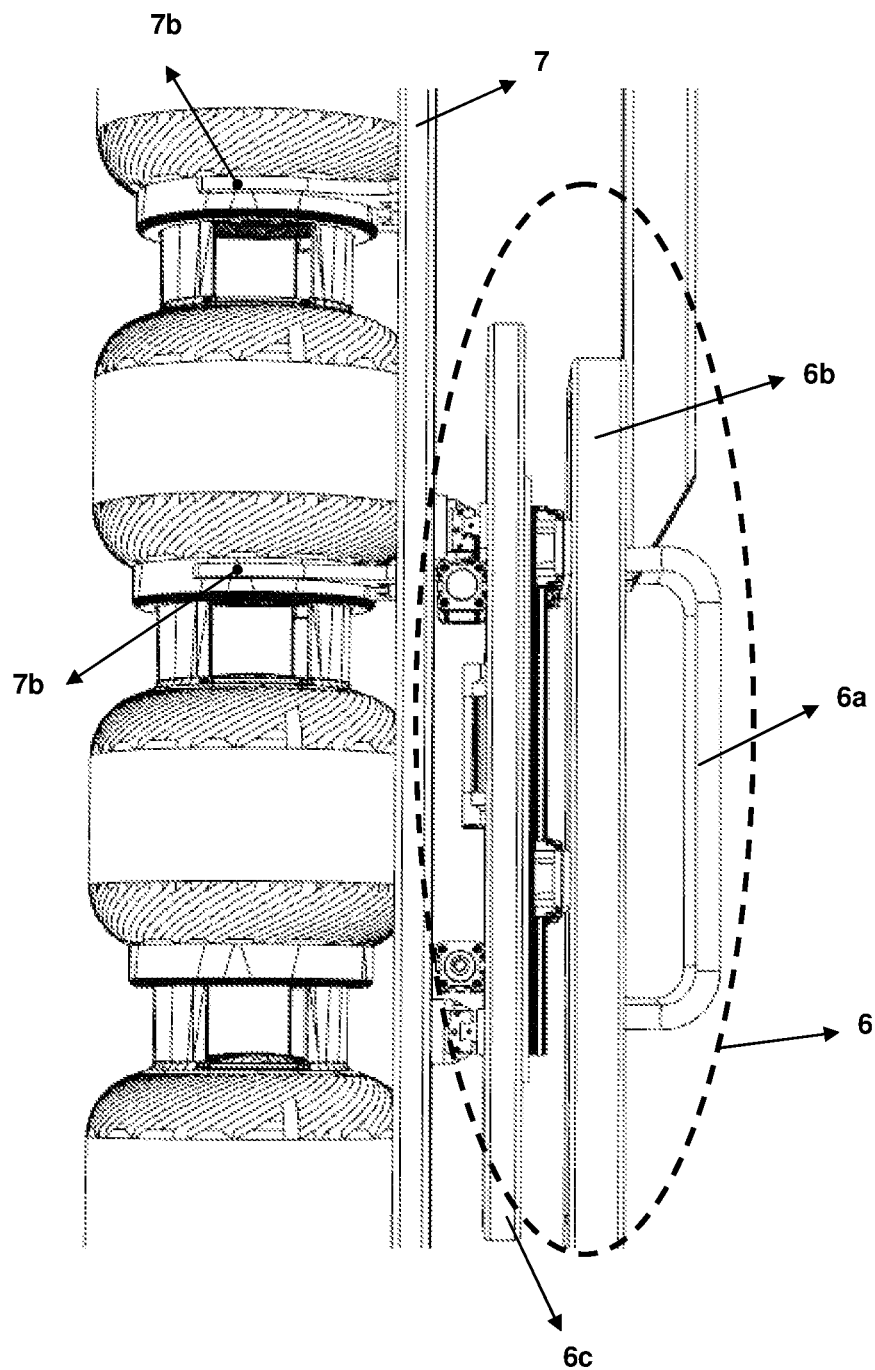
FIG. 4, is a side view of a movable mechanism of the transportation system according to the present invention.

The transportation system (S) according to the present invention, as illustrated in FIGS. 1-4, comprises at least one stacking unit (S1) for stacking containers (C) one above another, at least one transport unit (S2) for transporting the stacked containers (C) into the desired position and at least one panel (P) on which said stacking unit (S1) and transport unit (S2) are positioned. Said stacking unit (S1) comprises at least a first body (1) in which the containers (C) are stacked one above another and which is positioned on the said panel (P); at least one transport element (2), preferably in the form of a cabin opened on at least two sides thereof, for transferring the container (C) desired to be stacked from the position where it is located onto the said panel (P), by means of at least a first displacing member (not shown) and including at least one base (2a) on which said container (C) is placed; at least a second displacing member (not shown) for transferring the container (C) positioned on the said base (2a) into the said first body (1); at least one gripping arm (3) that holds a container (C) transferred into the first body (1) preferably at a base portion of the container (C); at least a third displacing member (not shown) that moves the said gripping arm (3) in a direction perpendicular to the panel (P); and at least one locking arm which is positioned in the said first body (1) and at a desired height from the panel (P), and which has at least one flexible member (i.e. a spring) that holds the container (C) that has reached to the said height, at the height where it is located. In order to transport the containers (C) stacked in the stacking unit (S1) one above another into a desired position, said transport unit (S2) comprises at least one displacing arm which is positioned on at least a second body (5d) contained therein and which is capable of rotating; at least one displacing mechanism (6) including at least one fixed plate (6b) positioned on the said displacing arm and having at least one guiding arm (6a) for moving the containers (C) received from the first body (1) in stacked condition, and at least one movable plate (6c) capable of moving on the said fixed plate (6b) with respect to the panel (P), preferably in an upward-and-downward direction; at least one transport arm (7a) which is associated with the said movable plate (6c) and which lifts the stacked containers (C) preferably by holding the lowermost container (C) at a portion thereof close to the base; and at least one support shaft (7) having at least one fixing arm (7b) preferably positioned so as to hold the uppermost container (C) in order to prevent said containers (C) to be separated from each other during the transportation, and which preferably contacts to the lateral surface of the said stacked containers (C). Said first displacing member, second displacing member and third displacing member may be in the form of a piston.

In an illustrative embodiment of the invention, the stacking unit (S1) stacks the containers (C) one above another. The container (C) desired to be stacked is taken from the position where it is located by means of the first displacing member and placed onto the base (2a) in the moving transport element (2). The container (C) in the transport element (2) is carried into the first body (1) by means of the second displacing member. The container (C) received in the first body (1) is gripped by the gripping arm (3). Said gripping arm (3) and the container (C) carried by it is raised to a certain height from the panel (P) by means of the third displacing member. In the said position, the container (C) is locked by at least one locking arm located on the first body (1). Meanwhile, the gripping arm (3) and container (C) are released from each other and the gripping arm (3) moves to carry the next container (C). Likewise, with the movement of the transport element (2), the container (C) taken from its position is pushed into the first body (1) by means of the second displacing member and the gripping arm (3) arranges a newly arrived container (C) below the container (C) held by the locking arms. The lower-positioned container (C) pushes the upper-positioned container (C) upward, which causes the flexible member of the locking arms to be constrained, and the second container (C) carried by the gripping arm (3) settles on the locking arm. This is continued until a desired number of containers (C) is stacked one above another. When the last container (C) desired to be stacked is pushed from the transport element (2) into the first body (1) by means of the second displacing member, stacked containers (C) hold by the locking arm are released, so that those containers (C) that have been previously stacked one above another are settled on the lowermost positioned container (C). In this manner, within the first body (1), the containers (C) are stacked one above another, with the last container (C) placed into the said first body (1) being located at the lowermost position. The transport arm (7a) of the transport unit (S2) holds the lowermost positioned one of the containers (C) stacked in the first body (1) and the fixing arm (7b) holds the uppermost positioned one of the said containers (C). Said support shaft (7) contacts the containers (C) so that the containers (C) are maintained in an aligned position. Since the said containers (C) are held at the upper and lower sides thereof, containers (C) are prevented from tilting. The movable plate (6c) of the displacing mechanism (6) with which the support shaft (7) is associated slides on the fixed plate (6b) such that it gets close to and moves away from the panel (P) on which the transport unit (S2) is located, so that an upward-and-downward movement of the containers (C) is achieved. By means of the guiding arm (6a) provided on the said fixed plate (6b), a user may direct the containers (C) to the desired position with minimum effort. With the rotating movement of the displacing arm connected with the displacing mechanism (6), said containers (C) are moved radially.

In an alternative embodiment of the invention, the displacing arm preferably comprises at least a first section (5a) with at least one movable portion which is rotatable about an axis, at least a second section (5b) which is connected with the first section (5a) at one end and which extends preferably parallel to the panel (P), and at least a third section (5c) connected with the said second section (5b) (preferably extending perpendicular to the panel (P)) and which is rotatable about an axis. In another embodiment, the second section (5b) of the displacing arm consists of at least two pieces connected to each other by means of at least one connecting member, which may be a hinge. In this manner, motion capacity of the transport unit (S2) is increased.

In an alternative embodiment of the invention, the transport element (2) comprises at least one extension located on that side facing the first body (1). In this embodiment, the first body (1) comprises, on its side facing the transport element (2), at least one guide in which said extension is moved while the containers (C) are transported from their position onto the panel (P). With the movement of the said extension in the guide, the transport element (2) can move in a more stable manner so that tilting and/or sliding of the container (C) positioned in the transport element (2) is prevented.

In another alternative embodiment of the invention, the base (2a) on which the container (C) is placed comprises at least one hole (2b) positioned such that it divides the base into two pieces. Said hole (2b) preferably extends longitudinally such that one side thereof is close to the first body (1) whereas the other side thereof is away from the first body (1). Thanks to the said hole (2b), the second displacing member that transfers the container (C) positioned on the transport element (2) into the first body (1) is passed through the said hole (2b) and moved towards the first body (1) and thus allows the container (C) in the transport element (2) to move towards the first body (1). Thus, upon the transfer of the said container (C) from the transport element (2) into the first body (1), the transport element (2) may move to receive the next container, without waiting for the second displacing member to return. In this manner, stacking of the containers (C) is accelerated.

In a preferred embodiment of the invention, the gripping arm (3) that holds the container (C) settled in the first body (1) comprises at least two pieces which are preferably in the form of a clamp. In this embodiment, the stacking unit (S1) comprises at least a forth displacing member (3a), preferably in the form of a piston, which allows the said two pieces to move close to and away from the container (C). In this way, the container (C) may be safely gripped at any section thereof.

In another preferred embodiment of the invention, the transport system (S) comprises at least one support member, preferably at least one end of which is positioned on the said panel (P), in order to reliably maintain the container (C) carried by the locking arm at the height it is located. Said support member exerts power in the reverse direction to the weight of the container (C) carried by the locking arm and supports the locking arm.

In another preferred embodiment of the invention, the transportation system (S) comprises at least one shaft (4) which is positioned in the stacking unit (S1) such that it prevents movement of the containers (C) stacked in the first body (1), which contacts at least one side of the containers (C), and which is connected to the said first body (1) by means of at least one connecting member (4a). In another preferred embodiment, the stacking unit (S1) comprises at least four shafts (4) that surround the said containers (C) and fix them in place, such that the stacked containers (C) are prevented from moving out of the first body (1) while its undesired movements such as tilting and sliding are also prevented. In a preferred embodiment, the connecting member (4a) which connects at least one shaft (4) of the said shafts (4) that is located on that side of the first body (1) facing away from the transport element (2), to the first body (1) is capable of rotating about an axis. Therefore, the shaft (4) connected to the first body (1) by means of the rotatable connecting member (4a) may rotate about the said axis and may allow the stacked containers (C) to move out of the first body (1). The transport unit (S2) is allowed to receive the completely stacked containers (C) from the first body (1) in a reliable manner.

In another preferred embodiment of the invention, the transportation system (S) comprises at least two support shafts (7) which are connected with the movable plate (6c), which are spaced from each other and which preferably extend in parallel to each other. In this embodiment, a part of the side surfaces of the containers (C) which are especially in cylindrical form is interposed between the said two support shafts (7), thus the containers (C) are transported in a safer manner.

In another preferred embodiment of the invention, the displacing arm (7) and the fixing arm (7b) of the support shaft (7) are movable on the support shaft. Thus, the desired container (C) may be gripped at any section thereof, whereby a safer transportation is obtained.

In another preferred embodiment of the invention, the movable plate (6c) comprises at least one extension in order to move on the fixed plate (6b) whereas the fixed plate (6b) comprises at least one guide in order to receive the said extension.

In an alternative embodiment of the invention, in order to have a smooth stacking process, the stacking unit (S1) includes at least one detector that detects the container (C) ready for stacking and at least one control unit that drives the transport element (2) when the said container (C) is detected.

In another embodiment of the invention, the transportation system (S) comprises at least one movable part (P1) (which may for example be a wheel) that allows the transportation system (S) to be carried into a desired position, in order to transport containers (C) in different units, and that is located on that part of the panel (P) facing the ground. In this manner, said transportation system (S) may be applied to different systems. In this embodiment, the said panel (P) comprises at least one protective sheath (P2) which is preferably located around the said movable part (P1), in order to render it more reliable during the use thereof.

With the present invention, there is provided a transportation system (S) which picks the containers (C) that are desired to be stocked and/or transferred to a position to stack them one above another and which transports the stacked containers (C) into a desired position. Said transportation system (S) is easy-to-manufacture and easy-to-use and it is also economical, which at the same time prevents undesired movement (i.e. tilting) of the stacked containers (C) during the said operations and provides a reliable transportation process.

The invention claimed is:

1. A transportation system (S) which performs stacking and transportation of containers (C) that contain solid, liquid and/or gaseous material, in order to transport said containers (C) from one position into another in a multiple manner, and which includes at least one panel (P), characterized by comprising:
   at least one stacking unit (S1) positioned on the panel (P) that allows the containers (C) to be stacked one above another and that includes at least a first body (1) in which the containers are stacked and which is positioned on the said panel (P); at least one transport element (2) for transferring the container (C) desired to be stacked from the position where it is located onto the said panel (P), and including at least one base (2a) on which said container (C) is placed; at least one gripping arm (3) that holds the container (C) transferred into the first body (1); and at least one transport unit (S2) which is positioned on the panel (P) and which includes at least one displacing arm which allows the containers (C) stacked one above another in the stacking unit (S1) to be transported into a desired position and which is positioned on at least a second body (5d) contained therein and which is capable of rotating; at least one displacing mechanism (6) including at least one fixed plate (6b) positioned on the said displacing arm and having at least one guiding arm (6a) for moving the containers (C) received in stacked condition, and at least one movable plate (6c) capable of moving on the said fixed plate (6b) with respect to the panel (P); at least one transport arm (7a) which is associated with the said movable plate (6c) and which lifts the stacked containers (C); and at least one support shaft (7) having at least one fixing arm (7b) positioned so as to hold at least one container (C) in order to prevent said containers (C) to be separated from each other during the transportation, and which contacts the said stacked containers (C).

2. A transportation system (S) according to claim 1, characterized in that the said transport element (2) is in the form of a cabin opened on at least two sides thereof.

3. A transportation system (S) according to claim 1, characterized in that the said transport arm (7a) is positioned so as to hold the lowermost positioned one of the stacked containers (C).

4. A transportation system (S) according to claim 1, characterized in that the said fixing arm (7b) is positioned so as to hold the uppermost positioned one of the stacked containers (C).

5. A transportation system (S) according to claim 1, characterized in that the said displacing arm comprises at least a first section (5a) with at least one movable portion which is rotatable about an axis, at least a second section (5b) which is connected with the first section (5a) at one end, and at least a third section (5c) connected with the said second section (5b) and which is rotatable about an axis.

6. A transportation system (S) according to claim 5, characterized in that the second section (5b) is positioned in parallel to the panel (P).

7. A transportation system (S) according to claim 5, characterized in that the third section (5c) is positioned perpendicular to the panel (P).

8. A transportation system (S) according to claim 5, characterized in that the second section (5b) comprises at least two pieces connected to each other by means of at least one connecting member.

9. A transportation system (S) according to claim 1, characterized in that the base (2a) on which the said container (C) is placed comprises at least one hole (2b) positioned such that it divides the base into two pieces.

10. A transportation system (S) according to claim 9, characterized in that the said hole (2b) extends longitudinally such that one side thereof is close to the first body (1) whereas the other side thereof is away from the first body (1).

11. A transportation system (S) according to claim 1, characterized in that the gripping arm (3) that holds the container (C) settled in the first body (1) comprises at least two pieces.

12. A transportation system (S) according to claim 11, characterized in that the said two pieces are in the form of a clamp.

13. A transportation system (S) according to claim 11, characterized in that the stacking unit (S1) comprises at least a displacing member (3a) which allows the said two pieces to move close to, and away from, the container (C).

14. A transportation system (S) according to claim 13, characterized in that the said displacing member (3a) is a piston that performs said movement of getting close to and moving away.

15. A transportation system (S) according to claim 1, characterized by comprising at least one shaft (4) which is positioned in the stacking unit (S1) such that it prevents undesirable movement of the containers (C) stacked in the first body (1), which contacts at least one side of the containers (C), and which is connected to the said first body (1) by means of at least one connecting member (4a).

16. A transportation system (S) according to claim 15, characterized by comprising at least one connecting member (4a) that connects the said shaft (4) to the first body (1) such that it can rotate about an axis.

17. A transportation system (S) according to claim 1, characterized in that said transport arm (7a) is capable of rotating on the support shaft.

18. A transportation system (S) according to claim 1, characterized in that said fixing arm (7b) is capable of rotating on the support shaft.

19. A transportation system (S) according to claim 1, characterized in that the movable plate (6c) comprises at least one extension in order to move on the fixed plate (6b) whereas the fixed plate (6b) comprises at least one guide in order to receive the said extension.

20. A transportation system (S) according to claim 1, characterized by comprising at least one control unit that drives the transport element (2) when the said container (C) is detected.

21. A transportation system (S) according to claim 1, characterized by comprising at least one movable part (P1) that is located on that side of the panel (P) facing the ground.

22. A transportation system (S) according to claim 21, characterized in that the movable part (P1) is a wheel.

23. A transportation system (S) according to claim 21, characterized in that the said panel (P) comprises at least one protective sheath (P2) which is located around the said movable part (P1), in order to render it more reliable during the use thereof.

* * * * *